(12) United States Patent
Tsuzuki et al.

(10) Patent No.: US 11,172,159 B2
(45) Date of Patent: Nov. 9, 2021

(54) MONITORING CAMERA SYSTEM AND REPRODUCTION METHOD

(71) Applicant: Panasonic i-PRO Sensing Solutions Co., Ltd., Fukuoka (JP)

(72) Inventors: Kazuhisa Tsuzuki, Osaka (JP); Kanji Sato, Osaka (JP)

(73) Assignee: PANASONIC I-PRO SENSING SOLUTIONS CO., LTD., Fukuoka (JP)

(*) Notice: Subject to any disclaimer, the term of this patent is extended or adjusted under 35 U.S.C. 154(b) by 0 days.

(21) Appl. No.: 15/684,189

(22) Filed: Aug. 23, 2017

(65) Prior Publication Data

US 2018/0063470 A1 Mar. 1, 2018

(30) Foreign Application Priority Data

Aug. 31, 2016 (JP) .............................. JP2016-170108

(51) Int. Cl.
| | |
|---|---|
| *H04N 5/92* | (2006.01) |
| *G11B 27/00* | (2006.01) |
| *H04N 5/77* | (2006.01) |
| *H04N 5/781* | (2006.01) |
| *H04N 5/783* | (2006.01) |

(52) U.S. Cl.
CPC ............ *H04N 5/92* (2013.01); *G11B 27/005* (2013.01); *H04N 5/77* (2013.01); *H04N 5/781* (2013.01); *H04N 5/783* (2013.01)

(58) Field of Classification Search
CPC ..... H04N 5/92–528; H04N 5/77–7755; H04N 5/78–784; G11B 27/005
See application file for complete search history.

(56) References Cited

U.S. PATENT DOCUMENTS 8,619,168 B2 * 12/2013 Choi .................. H04N 5/35554
348/294
9,082,018 B1 * 7/2015 Laska .................. G06F 3/0485
(Continued)

FOREIGN PATENT DOCUMENTS

| JP | 10-336632 | 12/1998 |
|---|---|---|
| JP | 2000-209571 | 7/2000 |
| JP | 2002-369146 | 12/2002 |

*Primary Examiner* — Lindsay J Uhl
(74) *Attorney, Agent, or Firm* — Wenderoth, Lind & Ponack, L.L.P.

(57) ABSTRACT

There is provided a monitoring camera system including at least one monitoring camera and a recorder connected to the monitoring camera. The monitoring camera captures an image of an area of a monitoring target, detects a motion in a captured video of the area, associates information relating to the motion with the captured video, and transmits the associated result to the recorder. The recorder associates the captured video of the area captured by the monitoring camera and the information relating to the motion with the monitoring camera, and records the associated result. The recorder reproduces the captured video of the area on a monitor recorded in the way that a reproduction speed of the captured video in a section in which the motion is not detected on the monitor is faster than a reproduction speed of the captured video in a section in which the motion is detected, based on the information relating to the motion.

8 Claims, 9 Drawing Sheets

(56) References Cited

U.S. PATENT DOCUMENTS

| | | | |
|---|---|---|---|
| 2003/0046080 A1* | 3/2003 | Hejna, Jr. | G09B 5/06 |
| | | | 704/270 |
| 2009/0136213 A1* | 5/2009 | Calisa | G06Q 10/06316 |
| | | | 386/248 |
| 2017/0076571 A1* | 3/2017 | Borel | G08B 13/19673 |

* cited by examiner

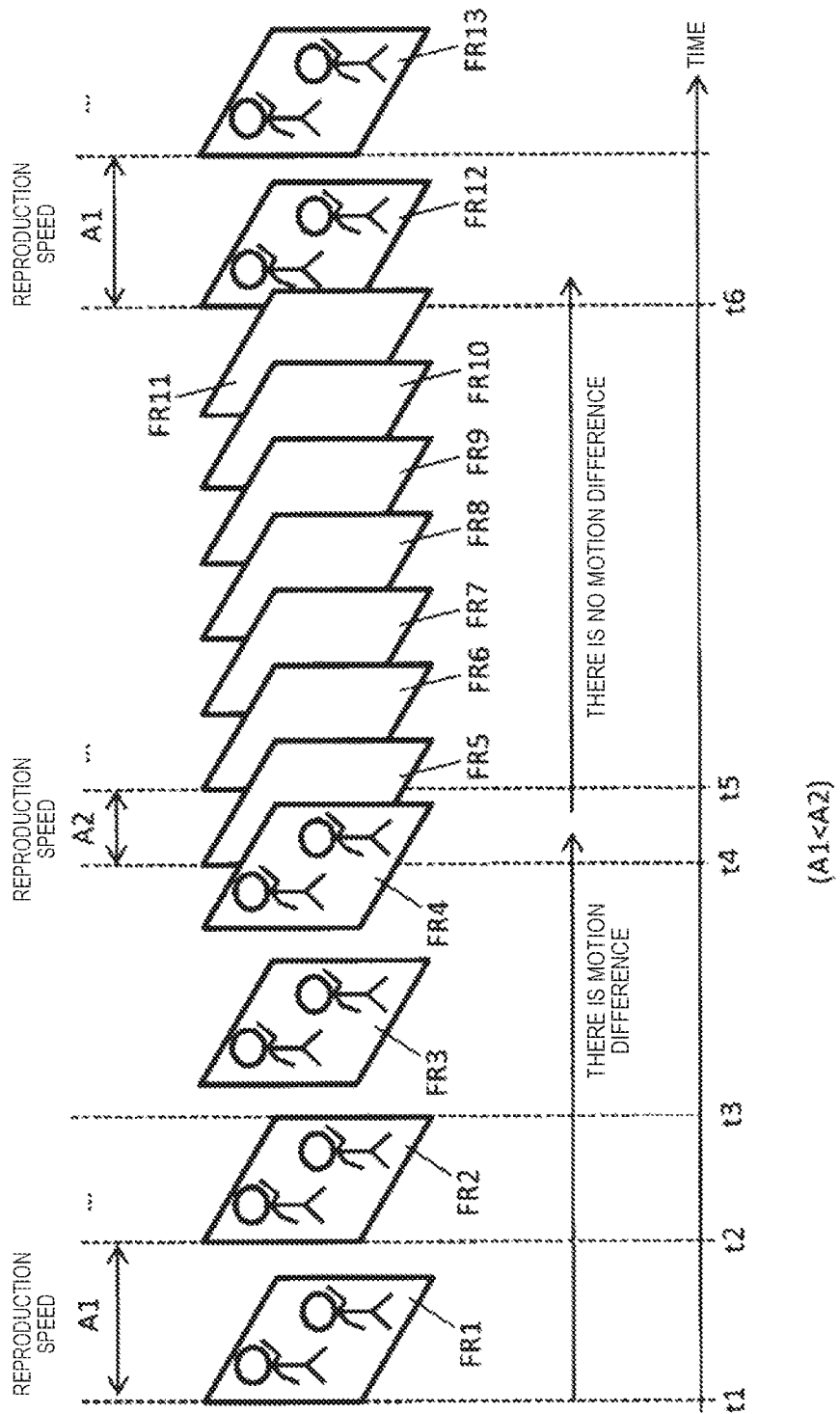

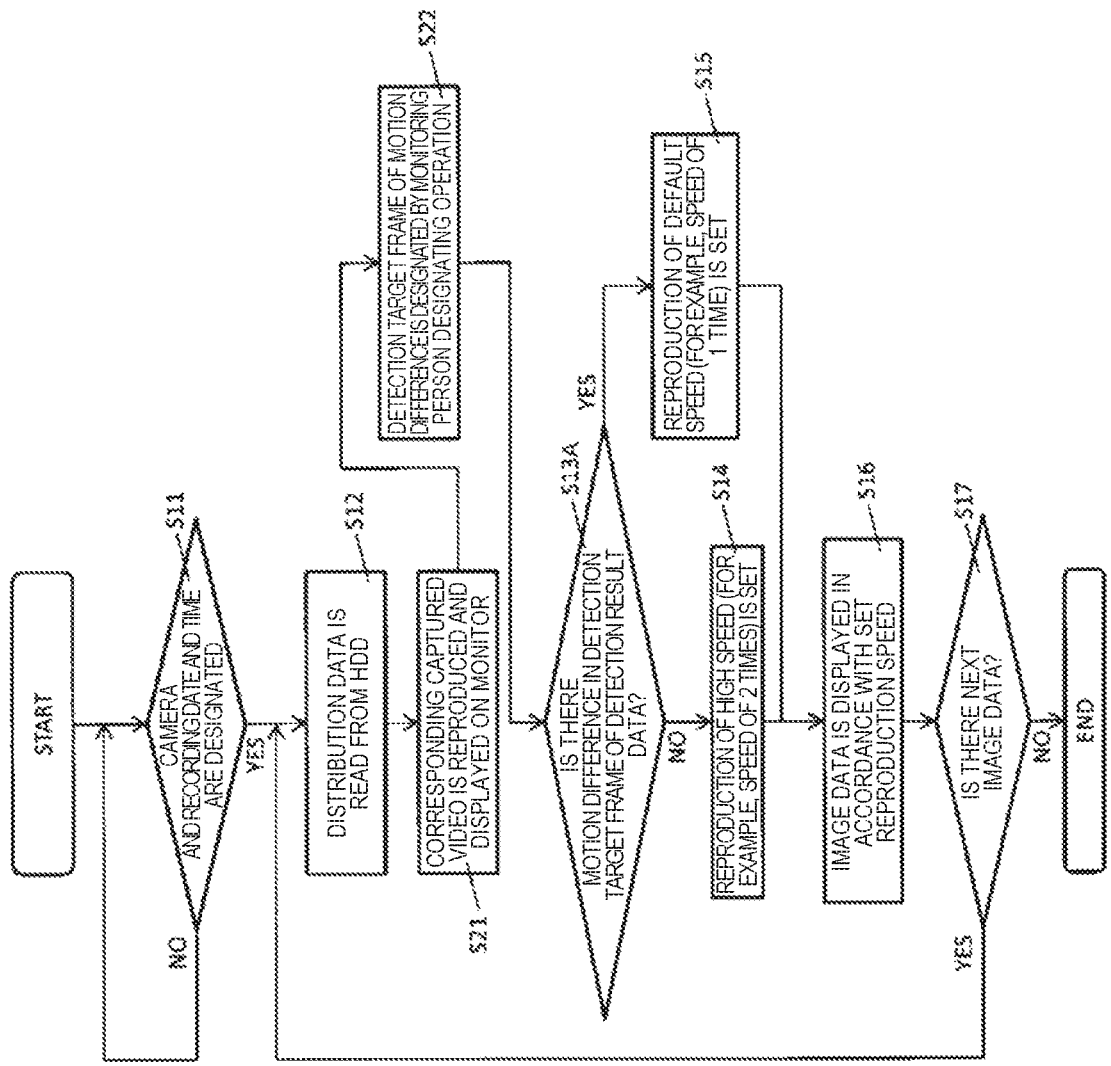

MONITORING CAMERA SYSTEM AND REPRODUCTION METHOD

BACKGROUND

1. Technical Field

The present disclosure relates to a monitoring camera system and a reproduction method for reproducing data of an image or video recorded in a recorder by being photographed with a camera.

2. Description of the Related Art

Recently, for example, for the purpose of improving security such as crime prevention, or recording evidence images supporting cause investigation when there were some troubles, a plurality of monitoring cameras are set not only indoors and outdoors but also various places (for example, stores).

Here, as a related art of a monitoring camera system for enlarging and monitoring an image in the vicinity of an intruder, for example, Japanese Patent Unexamined Publication No. 2000-209571 has been proposed. The monitoring camera system described in Japanese Patent Unexamined Publication No. 2000-209571 displays an output video signal from a monitoring camera on a display device, or performs monitoring by reproducing the signal after recording the signal on the VTR. When detecting intrusion of an intruder into a monitoring area by an infrared sensor, the monitoring camera system detects a moving part of an image from luminance change or the like of the output video signal from the monitoring camera, and specifies a position of the intruder on the image from the moving part. In addition, the monitoring camera system enlarges and reads data in the vicinity of an intruder in an image frame as a new video signal. With this, the monitoring camera system can easily specify and monitor intruders.

However, in a configuration of Japanese Patent Unexamined Publication No. 2000-209571, a monitoring camera system reproduces a recorded output video signal at the same speed in a section where there is no intruder (that is, section in which a monitoring person does not need to monitor). For this reason, it was necessary for the observer to view the reproduced video of the output video signal, or if, for example, a fast-forwarding button is provided, it was necessary to reproduce the video while running only the section (that is, section that the above-described monitoring person does not need to monitor) with the fast-forward button or the like. Accordingly, a considerable time is required for checking content of the video desired to be checked by the monitoring person, and an operation required for the monitoring person to quickly check the content of the video becomes complicated, so that the usability of the monitoring person was not good.

SUMMARY

In order to solve the above-described problems in the related art, an object of the present disclosure is to provide a monitoring camera system and a reproduction method for shortening a content check time of a video desired to be checked by a monitoring person in a case where any incident occurs, and improving the usability of the monitoring person when investigating the cause of the incident without performing a complicated operation by the monitoring person.

According to the present disclosure, there is provided a monitoring camera system including at least one monitoring camera; and a recorder connected to the monitoring camera, in which the monitoring camera captures an image of an area of a monitoring target, detects a motion in a captured video of the area, associates information relating to the motion with the captured video, and transmits the associated result to the recorder, the recorder associates the captured video of the area captured by the monitoring camera and the information relating to the motion with the monitoring camera, and records the associated result, and the recorder reproduces the captured video of the area on a monitor recorded in the way that a reproduction speed of the captured video in a section in which the motion is not detected on the monitor is faster than a reproduction speed of the captured video in a section in which the motion is detected, based on the information relating to the motion corresponding to a designated target frame according to designation of at least one target frame with respect to the captured video of the area displayed on the monitor.

In addition, according to the present disclosure, there is provided a reproduction method in a monitoring camera system including at least one monitoring camera and a recorder, the method including causing the monitoring camera to capture an image of an area of a monitoring target, detect a motion in a captured video of the area, associate information relating to the motion with the captured video, and transmit the associated result to the recorder; causing the recorder to associate the captured video of the area captured by the monitoring camera and the information relating to the motion with the monitoring camera, and record the associated result; and causing the recorder to reproduce the captured video of the area on a monitor recorded in the way that a reproduction speed of the captured video in a section in which the motion is not detected on the monitor is faster than a reproduction speed of the captured video in a section in which the motion is detected, based on the information relating to the motion corresponding to a designated target frame according to designation of at least one target frame with respect to the captured video of the area displayed on a monitor.

According to the present disclosure, it is possible to shorten a content check time of a video desired to be checked by a monitoring person in a case where any incident occurs, and to improve the usability of the monitoring person when investigating the cause of the incident without performing a complicated operation by the monitoring person.

BRIEF DESCRIPTION OF THE DRAWINGS

FIG. 7 is a schematic diagram illustrating an example of relationship between the presence or absence of motion difference and the reproduction speed;

FIG. 9 is a flowchart for explaining an example of an operation procedure relating to setting of a reproduction speed of a recorder of a modification example of the embodiment in detail.

DETAILED DESCRIPTION

Hereinafter, an embodiment (hereinafter, referred to as "present embodiment") in which a monitoring camera system and a reproduction method relating to the present disclosure are particularly disclosed will be described in detail with reference to the drawings as appropriate. However, detailed explanation more than necessary may be omitted. For example, there are cases where redundant explanations with respect to detailed descriptions of well-known matters and substantially the same configuration are omitted. This is to avoid the unnecessary redundancy of the following description and to facilitate understanding by those skilled in the art. The accompanying drawings and the following description are provided to enable those skilled in the art to fully understand the present disclosure and are not intended to limit in the scope of the claims.

Hereinafter, monitoring camera system 50 (see FIG. 1) of the present embodiment will be described as being installed in a store (for example, convenience store). However, a place where the monitoring camera system of the present embodiment is installed is not limited to the store, and the monitoring camera system may be installed in various facilities that need to ensure security as crime prevention or the like such as public facilities (for example, libraries), offices, and factories.

Figure 1:
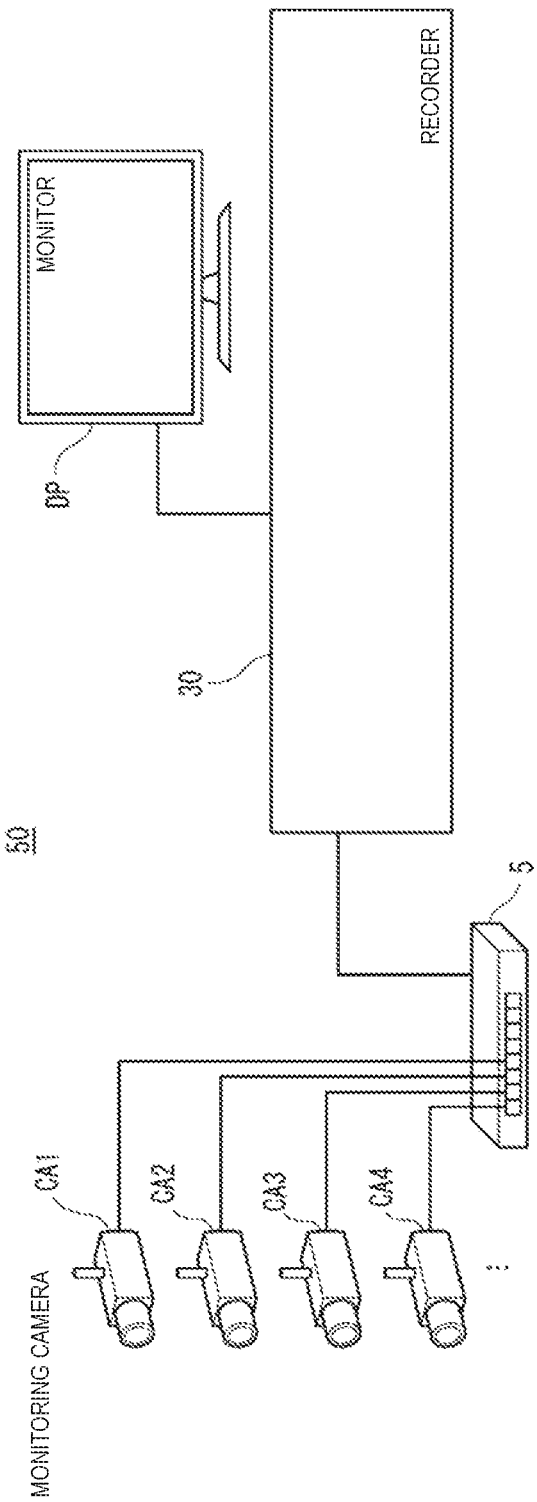
FIG. 1 is a system configuration diagram illustrating an example of a system configuration of a monitoring camera system of a present embodiment in detail.

FIG. 1 is a diagram illustrating an example of a system configuration of monitoring camera system 50 of the present embodiment in detail. For example, monitoring camera system 50 is configured by including four monitoring cameras CA1, CA2, CA3, and CA4, hub 5 as a concentrator, recorder 30, and monitor DP. Each of monitoring cameras CA1, CA2, CA3, and CA4 and recorder 30 are connected to each other through hub 5 by a wire. In monitoring camera system 50, each of monitoring cameras CA1, CA2, CA3, and CA4 and recorder 30 may be wirelessly connected through a wireless router using a wireless local area network (LAN) such as Wi-Fi (registered trademark).

In monitoring camera system 50, each of monitoring cameras CA1, CA2, CA3, and CA4 captures an image of an area set in advance to be captured as a monitoring target (that is, monitoring target area), and obtains an image (hereinafter, also referred to as "captured image") obtained by the capturing, or a video (hereinafter, referred to as "captured video") configured with a plurality of captured images. In addition, each of monitoring cameras CA1, CA2, CA3, and CA4 also detects the presence or absence of a motion of a subject (for example, moving object such as person and vehicle) in the captured image configuring the captured video. Each of monitoring cameras CA1, CA2, CA3, and CA4 transmits a result obtained by associating data of the captured image or the captured video with information relating to the presence or absence of the motion of the subject to recorder 30 through hub 5. Hereinafter, a combination of the data of the captured image or the captured video transmitted from each monitoring camera and the information relating to the presence or absence of the motion of the subject in the captured video is referred to as "distribution data". Recorder 30 records the distribution data transmitted from each of monitoring cameras CA1, CA2, CA3, and CA4.

The data of the captured video among the distribution data recorded in recorder 30 is reproduced in recorder 30 by an operation using operator OP such as a mouse of a user (hereinafter, referred to as "monitoring person") using recorder 30, and thus displayed on monitor DP.

For example, in a case where an incident (for example, theft, injury, or the like) occurs at a store (for example, convenience store) where monitoring camera system 50 is installed, the data of the captured video recorded in recorder 30 is used for grasping and analyzing a detailed situation at a time in which the incident has occurred and investigating cause of the incident occurrence by the monitoring person. In addition, when the above-mentioned case occurs, the monitoring camera system 50 itself, the recorder 30 itself, or the HDD 39 built in the recorder 30 may be delivered to a police station as a proof from the store. In this case, the data of the captured video recorded in recorder 30 may be used when detail of the incident is analyzed in the police station. In the analysis of the data of the captured video, there is a video at a moment when a moving object (for example, person, vehicle, or the like) is moved, or a video in a section where the motion is continued after the motion of the moving object as a target that the monitoring person usually focuses thereon in the captured video. A video at a moment when there is no motion of the moving object or a video in a section where there is no motion of the moving object is not usually noticed. For example, the video at the moment where there is the motion of the moving object is a video at a moment when a suspicious person or a vehicle is moved. For example, the video in the section where the motion is continued after the motion of the moving object is a video of the section in which the motion is continued after the suspicious person or vehicle starts to move.

Hub 5 is the concentrator that connects each of monitoring cameras CA1, CA2, CA3, and CA4 and recorder 30 by wires. In FIG. 1, four monitoring cameras CA1, CA2, CA3, and CA4 are illustrated. However, the number of monitoring cameras configuring monitoring camera system 50 is not limited to four, and four monitoring cameras CA1, CA2, CA3, and CA4 are connected to hub 5, and connected to recorder 30 through hub 5 by wires.

Recorder 30 is connected to monitor DP as an example of a display device, and receives an input operation using operator OP (see FIG. 3) by the monitoring person. Recorder 30 receives the distribution data transmitted from each of monitoring cameras CA1, CA2, CA3, and CA4, and records the received distribution data in large capacity HDD 39 (see FIG. 3).

For example, monitor DP is configured by using a liquid crystal display (LCD) or an organic electroluminescence (EL). Monitor DP displays data of the captured video (recorded video) corresponding to the monitoring camera and the recording date and time designated with respect to recorder 30 by an input operation of the monitoring person.

Figure 2:
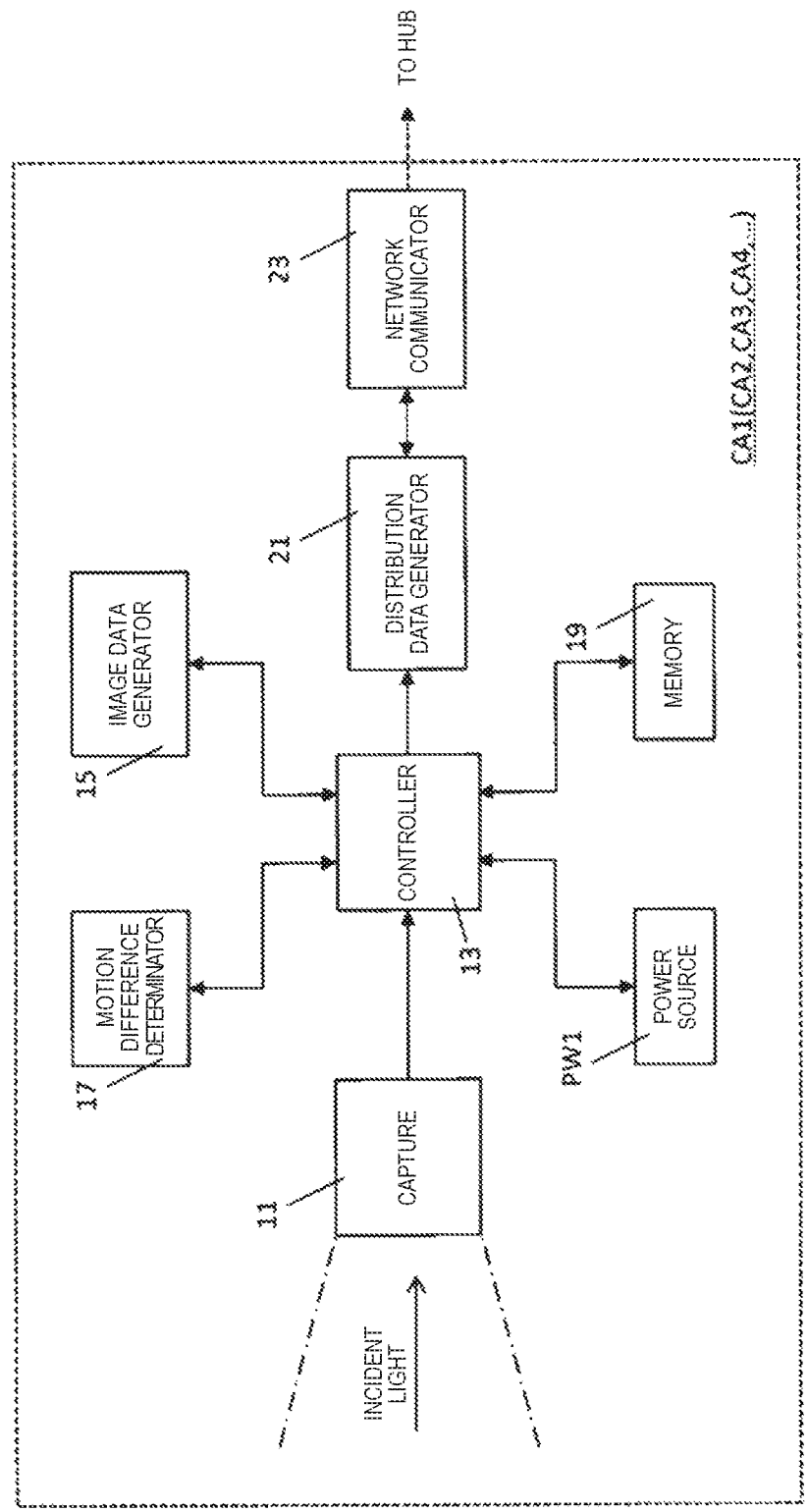
FIG. 2 is a block diagram illustrating an example of an internal configuration of a monitoring camera of the embodiment in detail.

FIG. 2 is a block diagram illustrating an example of an internal configuration of monitoring cameras CA1, CA2, CA3, and CA4 of the present embodiment in detail. Monitoring cameras CA1, CA2, CA3, and CA4 have the same configuration, and in the description of FIG. 2, monitoring camera CA1 will be described as an example. Monitoring camera CA1 includes capture 11, controller 13, image data generator 15, motion difference determinator 17, memory 19, distribution data generator 21, network communicator 23, and power source PW1.

Capture 11 includes at least one lens and an image sensor, and forms incident light incident on the lens on a predetermined imaging surface (also referred to as "light receiving surface") of the image sensor. For example, the image sensor is configured by using a charge coupled device (CCD) or a complementary metal oxide semiconductor (CMOS). With this, capture 11 obtains an electric signal of an optical image of the incident light incident on the lens, and outputs the obtained result to controller 13.

Controller 13 is configured by using a processor (for example, a central processing unit (CPU), a micro processing unit (MPU), or a digital signal processor (DSP)). Controller 13 performs a signal process for controlling collectively an operation of each part of monitoring camera CA1, an input and output process of data with other parts, a data calculation process, and a data storage process.

For example, when a distribution request of the captured image or the captured video transmitted from recorder 30 is received by network communicator 23, controller 13 obtains the distribution request through distribution data generator 21. Controller 13 instructs generation of the distribution data including the captured image or the data of the captured video stored and held in memory 19 and detection result data of the motion difference for each frame image configuring the captured image or the captured video according to the distribution request, to distribution data generator 21.

For example, image data generator 15 is configured by using the CPU, the MPU, or DSP. Image data generator 15 generates data configuring video data satisfying a predetermined format (for example, 11.264), or data of an RGB image or YUV image (hereinafter, referred to as "frame image") which is still image data of a predetermined format (for example, JPEG format), by performing an existing image process by using an output (that is, electric signal of optical image) of capture 11. Image data generator 15 generates the data of the captured image of the monitoring target area by using the data of the frame image, and outputs the generated data to controller 13. The data of the captured image also includes information on the captured date and time and the like. A function of image data generator 15 may be set by controller 13, and the process of image data generator 15 may be performed by controller 13. In this case, a configuration of image data generator 15 can be omitted in FIG. 2.

For example, motion difference determinator 17 is configured by using the CPU, the MPU, or DSP. Motion difference determinator 17 performs an existing motion detect process (for example, process of extracting difference between pixel value of immediately preceding frame image (for example, RGB value, luminance value, or the like) and pixel value of current frame image) for a pixel or the predetermined number (for example, 4 pieces×4 pieces) of pixels configuring the data of the captured image based on the data of the captured image (frame image). Hereinafter, although it is described that the motion detecting process is performed on one pixel as a processing unit, the same process is also performed on the above-described predetermined number of pixels as a processing unit. Motion difference determinator 17 determines whether or not there is a motion in the captured image (in other words, in angle of view of monitoring camera CA1) by performing the motion detecting process for each pixel. In a case where a difference between the pixel value of the immediately preceding frame image and the value of the current frame image on the same pixel is equal to or greater than a predetermined value, motion difference determinator 17 determines that there is a motion in the pixel. Meanwhile, in a case where the difference between the pixel value of the immediately preceding frame image and the value of the current frame image on the same pixel is lower than the predetermined value, motion difference determinator 17 determines that there is no motion in the pixel. Motion difference determinator 17 generates information indicating that there is a motion or there is no motion for each pixel as the detection result data of the motion difference, and outputs the generated information to controller 13. A function of motion difference determinator 17 may be set by controller 13, and the process of motion difference determinator 17 may be performed by controller 13. In this case, a configuration of motion difference determinator 17 can be omitted in FIG. 2.

For example, memory 19 includes a read only memory (ROM) in which a program and data of a setting value of defining an operation of monitoring camera CA1 are stored and a random access memory (RAM) in which various types of information used at the time of processing each part of monitoring camera CA1 and the data of the captured image or the captured video are temporarily stored.

For example, distribution data generator 21 is configured by using the CPU, the MPU, or DSP. Distribution data generator 21 generates the distribution data including as the data of the captured image or the captured video generated by image data generator 15 and the detection result data of the motion difference generated by motion difference determinator 17 according to an instruction from controller 13, and outputs the generated distribution data to network communicator 23. As described above, in the following description, the data of the captured image or the captured video configuring the distribution data includes date and time information captured by capture 11, for example, as capturing time information.

A function of distribution data generator 21 may be set by controller 13, and the process of distribution data generator 21 may be performed by controller 13. In this case, a configuration of distribution data generator 21 can be omitted in FIG. 2.

Network communicator 23 transmits the distribution data generated from distribution data generator 21 to recorder 30 through hub 5. When the distribution request of the captured image or the captured video is received from recorder 30, network communicator 23 outputs the distribution request to controller 13 through distribution data generator 21.

Power source PW1 supplies power source to each part of monitoring camera CA1.

Figure 3:
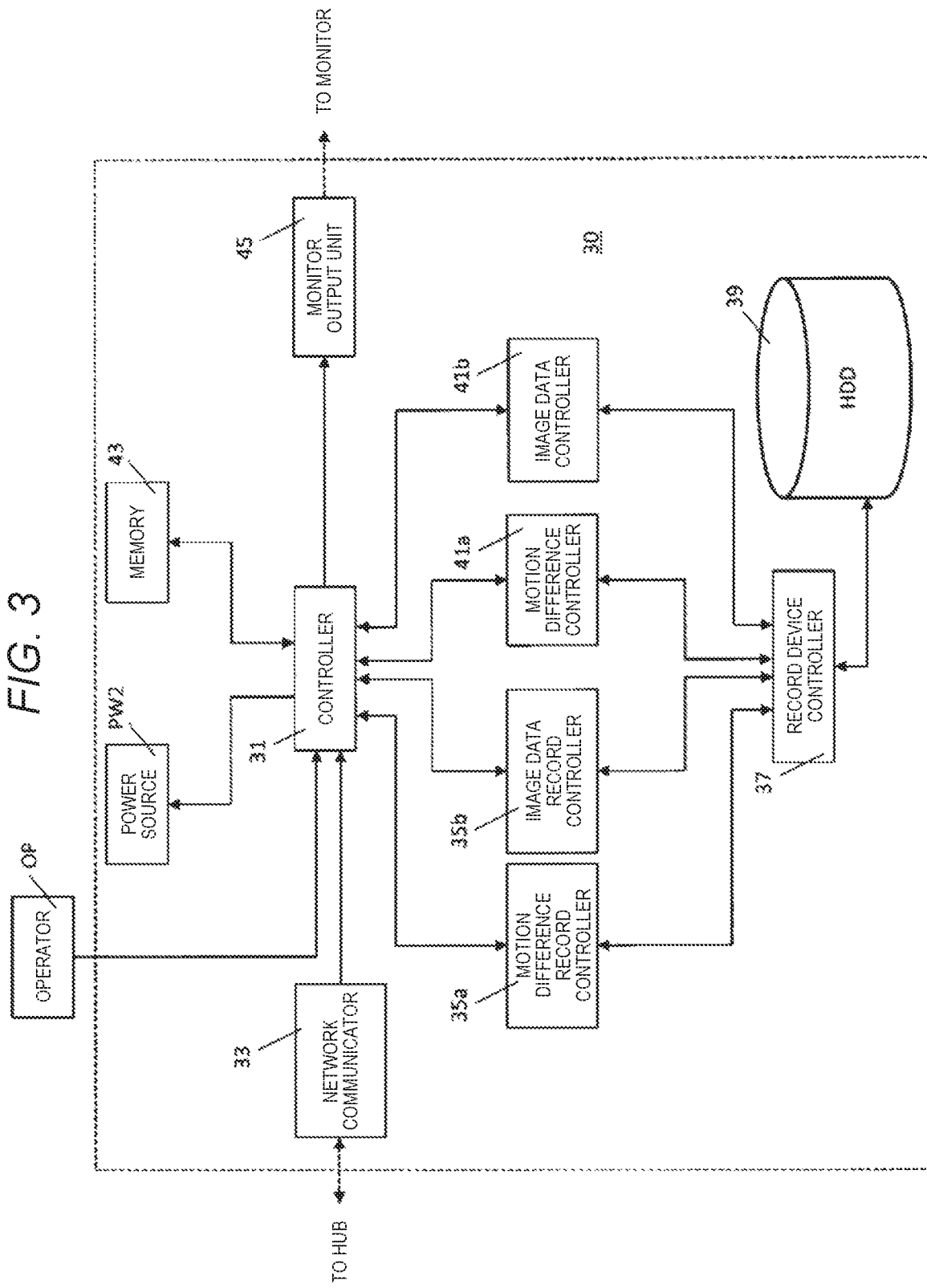
FIG. 3 is a block diagram illustrating an example of an internal configuration of a recorder of the embodiment in detail.

FIG. 3 is a block diagram illustrating an example of an internal configuration of recorder 30 of the present embodiment in detail. Recorder 30 includes controller 31, network communicator 33, motion difference record controller 35a, image data record controller 35b, record device controller 37, HDD 39, motion difference controller 41a, image data controller 41b, memory 43, monitor output unit 45, and power source PW2.

Controller 31 is configured by using processors (for example, CPU, MPU, and DSP). Controller 31 performs the signal process for controlling collectively an operation of each part of recorder 30, the input and output process of data with other parts, the data calculation process, and the data storage process.

For example, controller 31 determines a reproduction speed at the time of reproducing and displaying the data of the captured image or the captured video obtained from image data controller 41b on monitor DP based on the detection result data of the motion difference obtained from motion difference controller 41a. Controller 31 sets the determined reproduction speed (in other words, speed at which frame image configuring captured image or captured video is switched and displayed on monitor DP) for each frame image.

Controller 31 stores and holds information relating to monitoring cameras CA1, CA2, CA3, and CA4 currently connected to recorder 30 through hub 5 in memory 43. For example, the information relating to the monitoring camera corresponds to an internet protocol (IP) address.

Network communicator 33 receives the distribution data transmitted from each of monitoring cameras CA1, CA2, CA3, and CA4 through hub 5. In addition, network communicator 33 transmits the distribution request of the captured image or the captured video to each of monitoring cameras CA1, CA2, CA3, and CA4 connected through hub 5 according to an instruction from controller 31. The instruction from controller 31 may include an IP address of the monitoring camera, may be generated by controller 31 at regular periods (for example, once a day), and may be generated by controller 31 by an input operation of the monitoring person using operator OP.

For example, motion difference record controller 35a is configured by using the CPU, the MPU, or the DSP. Motion difference record controller 35a associates the detection result data of the motion difference for each image frame configuring the captured image or the captured video among the distribution data received by network communicator 33 with identification information of the monitoring camera according to an instruction of controller 31, and outputs the associated result to record device controller 37. A function of motion difference record controller 35a may be set by controller 31, and the process of motion difference record controller 35a may be performed by controller 31. In this case, a configuration of motion difference record controller 35a can be omitted in FIG. 3.

For example, image data record controller 35b is configured by using the CPU, the MPU, or the DSP. Image data record controller 35b associates the data of the captured image or the captured video among the distribution data received from network communicator 33 with the identification information of the monitoring camera according to the instruction of controller 31, and outputs the associated result to record device controller 37. A function of image data record controller 35b may be set by controller 31, and the process of image data record controller 35b may be performed by controller 31. In this case, a configuration of image data record controller 35b can be omitted in FIG. 3.

For example, record device controller 37 is configured by using the CPU, the MPU, or the DSP. Record device controller 37 associates the detection result data of the motion difference from motion difference record controller 35a and the data of the captured image or the captured video from image data record controller 35b which are related to the same identification information of the monitoring camera with the identification information of the monitoring camera, and records the associated result in HDD 39. Record device controller 37 outputs the detection result data of the motion difference corresponding to the identification information of the monitoring camera included in an obtainment request to motion difference controller 41a according to the obtainment request from motion difference controller 41a. Record device controller 37 outputs the data of the captured image or the captured video corresponding to the identification information of the monitoring camera included in the obtainment request to image data controller 41b according to the obtainment request from image data controller 41b. A function of record device controller 37 may be set by controller 31, and the process of record device controller 37 may be performed by controller 31. In this case, a configuration of record device controller 37 can be omitted in FIG. 3.

HDD 39 is configured with a large capacity hard disk drive (HDD). HDD 39 records a result obtained by associating the detection result data of the motion difference from motion difference record controller 35a and the data of the captured image or the captured video from image data record controller 35b which are related to the same identification information of the monitoring camera with the identification information of the monitoring camera. HDD 39 records the date and time information (that is, date and time information captured by capture 11 of monitoring cameras CA1, CA2, CA3, and CA4) included in the data of the captured image or the captured video as recording date and time information for HDD 39. Instead of HDD 39, a solid state drive (SSD) as a large capacity storage device may be provided in recorder 30.

For example, motion difference controller 41a is configured by using the CPU, the MPU, or the DSP. Motion difference controller 41a outputs the obtainment request of the detection result data of the motion difference corresponding to the data of the captured image or the captured video corresponding to the identification information and the recording date and time information of the monitoring camera to record device controller 37 according to the instruction from controller 31. The identification information and the recording date and time information of the monitoring camera are included in the instruction from controller 31. Motion difference controller 41a obtains the detection result data of the motion difference corresponding to the instruction from controller 31 from record device controller 37, and outputs the obtained detection result data to controller 31. A function of motion difference controller 41a may be set by controller 31, and the process of motion difference controller 41a may be performed by controller 31. In this case, a configuration of motion difference controller 41a can be omitted in FIG. 3.

For example, image data controller 41b is configured by using the CPU, the MPU, or the DSP. Image data controller 41b outputs the obtainment request of the data of the captured image or the captured video corresponding to the identification information and the recording date and time information of the monitoring camera, to record device controller 37 according to the instruction from controller 31. The identification information and the recording date and time information of the monitoring camera are included in the instruction from controller 31. Image data controller 41b obtains the data of the captured image or the captured video corresponding to the instruction from controller 31 from record device controller 37, and outputs the obtained data to controller 31. A function of image data controller 41*b* may be set by controller 31, and the process of image data controller 41*b* may be performed by controller 31. In this case, a configuration of image data controller 41*b* can be omitted in FIG. 3.

For example, memory 43 includes the ROM in which a program and data of a setting value of defining an operation of recorder 30 are stored and the RAM in which various types of information used at the time of processing each part of recorder 30, the detection result data of the motion difference, and the data of the captured image or the captured video are temporarily stored.

Monitor output unit 45 outputs the frame image in which the captured image or the captured video is configured at the reproduction speed set by controller 31 for each frame image according to the instruction from controller 31 to monitor DP, and displays the frame image on monitor DP. A function of monitor output unit 45 may be set by controller 31, and the process of monitor output unit 45 may be performed by controller 31. In this case, a configuration of monitor output unit 45 can be omitted in FIG. 3.

Power source PW2 supplies power source to each part of recorder 30.

Operator OP is a user interface (UI) of notifying controller 31 of an input operation content of the monitoring person, and configured with a pointing device such as a mouse and a keyboard. In addition, for example, operator OP may be configured by using a touch panel or a touch pad which is disposed corresponding to a screen of monitor DP and can perform a direct input operation with a finger of the monitoring person or a stylus pen.

Figure 4:
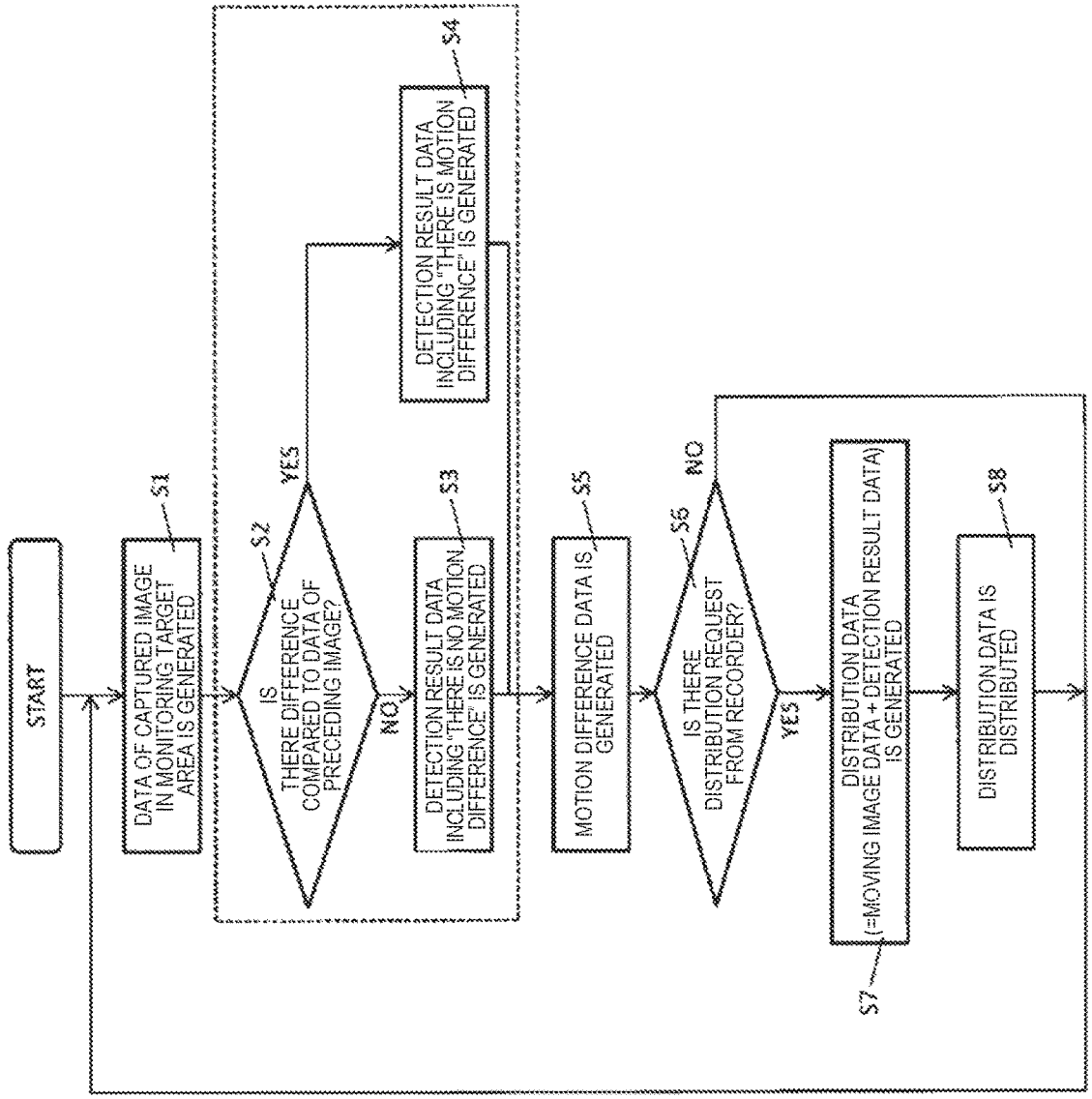
FIG. 4 is a flowchart for explaining a first example of an operation procedure relating to generation of distribution data of the monitoring camera of the embodiment in detail.

FIG. 4 is a flowchart for explaining the first example of an operation procedure relating to the generation of the distribution data in monitoring cameras CA1, CA2, CA3, and CA4 of the present embodiment in detail. Each process illustrated in FIG. 4 is similarly performed in any one of monitoring cameras CA1, CA2, CA3, and CA4, and will be described below by using monitoring camera CA1 as an example.

In FIG. 4, capture 11 of monitoring camera CA1 receives light reflected from a subject in the monitoring target area, obtains an electric signal of the optical image in the image sensor, and outputs the obtained electric signal to controller 13. Image data generator 15 of monitoring camera CA1 generates the data configuring the video data satisfying a predetermined format (for example, H.264), or the data of the frame image which is the still image data of a predetermined format (for example, JPEG format), by performing the existing image process by using an output (that is, electric signal of optical image) of capture 11 (S1).

Motion difference determinator 17 of monitoring camera CA1 extracts difference between a pixel value (for example, RGB value, luminance value, or the like) of a preceding (that is, immediately preceding) frame image and a pixel value of the current frame image for each pixel configuring the data of the captured image based on the data of the captured image (frame image) (S2).

In a case where it is determined that the difference between the pixel value of the immediately preceding frame image and the value of the current frame image is lower than a predetermined value (S2, NO), motion difference determinator 17 generates the detection result data of the motion difference (for example, "0" or "none") indicating that there is no motion difference for the pixel (S3).

Meanwhile, in a case where it is determined that the difference between the pixel value of the immediately preceding frame image and the value of the current frame image is equal to or greater than the predetermined value (S2, YES), motion difference determinator 17 generates the detection result data of the motion difference (for example, "1" or "YES") indicating that there is a motion difference for the pixel (S4). Motion difference determinator 17 repeatedly performs processes of steps S2 to S4 as a loop process (see dotted line portion) on the pixel or the predetermined number (for example, 4 pieces×4 pieces) of pixels configuring the entirety (entire area) of the frame images obtained by step S1, as a unit. With this, motion difference determinator 17 generates the detection result data of the motion difference relating to the entirety (entire area) of the frame images obtained by step S1 (S5).

Here, it is assumed that the distribution request of the captured image or the captured video is received from recorder 30 through network communicator 23 of monitoring camera CA1 (S6, YES). There is a case where monitoring camera CA1 cannot know in advance when the distribution request from recorder 30 is received. In addition, in monitoring camera CA1, a large capacity memory for storing the data of the captured video generated in the past before a certain period (for example, one day) is not usually provided, and only memory 19 for storing and holding the data of the captured video based on the captured image currently being captured is provided. Therefore, after receiving the distribution request from recorder 30, monitoring camera CA1 can generate the data of the captured video (moving image) configured with a plurality of the captured videos (frame image) which are captured can be generated, and the data of the captured video can be distributed to recorder 30 by including the data of the captured video (moving image) in the distribution data.

Meanwhile, in a case where the distribution request of the captured image or the captured video is not received from recorder 30 through network communicator 23 of monitoring camera CA1 (S6, NO), the process of monitoring camera CA1 returns to step S1.

Distribution data generator 21 of monitoring camera CA1 generates the distribution data including the data of the captured video (for example, H.264 format) based on the plurality of the captured images generated by image data generator 15 and the detection result data (that is, detection result data of motion difference for each of the plurality of frame images configuring captured video) of the motion difference generated by motion difference determinator 17 (S7). Network communicator 23 of monitoring camera CA1 transmits the distribution data generated in step S7 to monitoring camera CA1 through hub 5 (S8).

Figure 5:
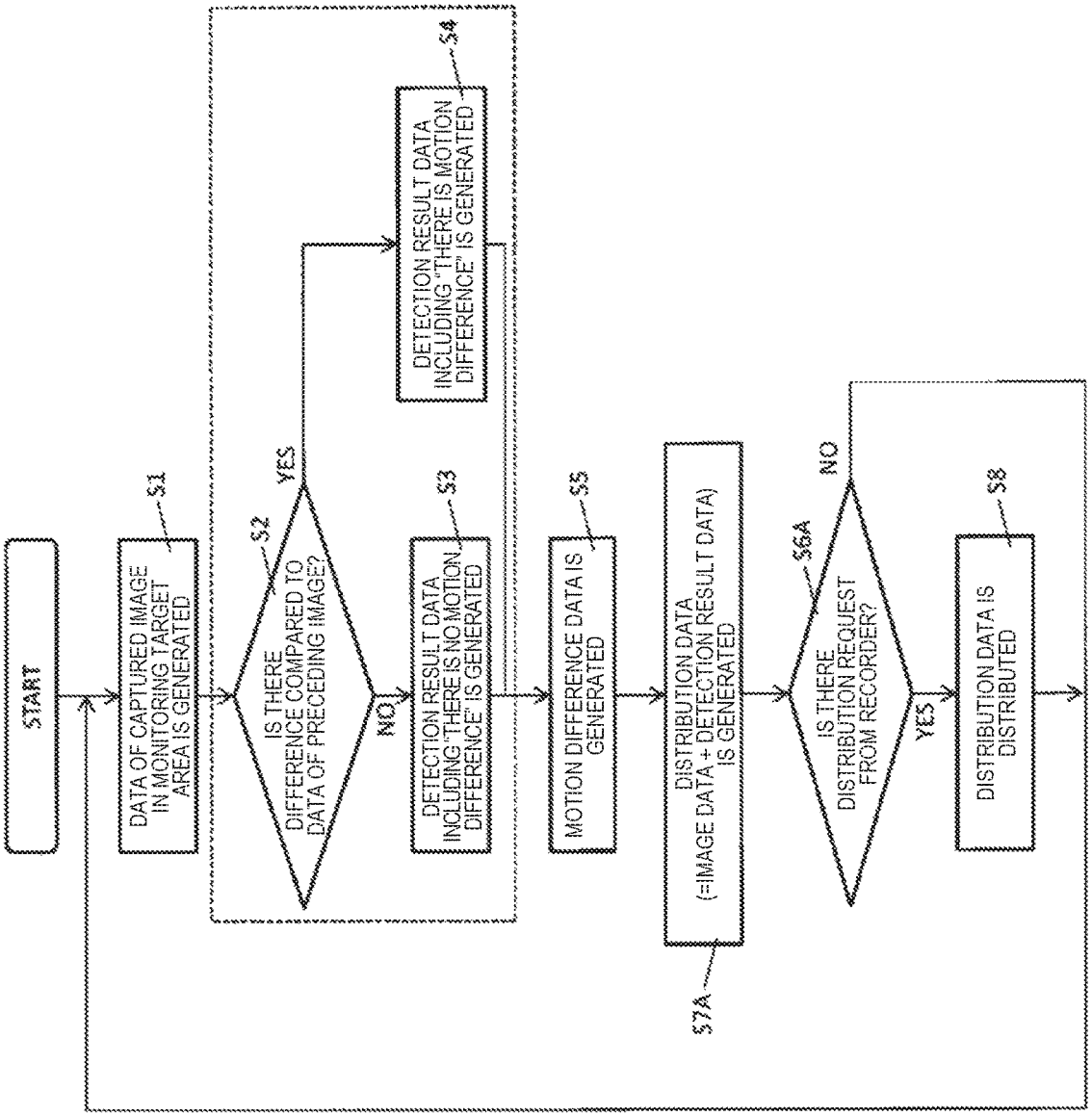
FIG. 5 is a flowchart for explaining a second example of the operation procedure relating to the generation of distribution data of the monitoring camera of the embodiment in detail.

FIG. 5 is a flowchart for explaining a second example of the operation procedure relating to the generation of the distribution data in monitoring cameras CA1, CA2, CA3, and CA4 of the present embodiment in detail. In the explanation of FIG. 5, the same step numbers are given to the same process as the process in FIG. 4, and the explanation will be simplified or omitted, and different contents will be described.

In FIG. 5, unlike FIG. 4, a timing at which monitoring camera CA1 generates the distribution data is a timing before step S6A (that is, before distribution request is received from recorder 30). Accordingly, in FIG. 4, monitoring camera CA1 generates the captured video configured by the plurality of the captured images captured after receiving the distribution request from recorder 30, and can distribute the generated video to recorder 30. However, in FIG. 5, since the distribution data is generated before receiving the distribution request from recorder 30, monitoring camera CA1 includes the data of the captured image (that is, still image) captured before receiving the distribution request from recorder 30 in the distribution data, and distributes the included data to recorder 30 without creating the captured video.

In FIG. 5, after step S5, distribution data generator 21 of monitoring camera CA1 generates the distribution data including the data of the captured image (for example, JPEG format) generated by image data generator 15 and the detection result data of the motion difference (that is, detection result data of motion difference for each frame image) generated by motion difference determinator 17 (S7A).

After step S7A, in a case where the distribution request of the captured image or the captured video is received from recorder 30 through network communicator 23 of monitoring camera CA1 (S6A, YES), network communicator 23 of monitoring camera CA1 transmits the distribution data generated in step S7A to monitoring camera CA1 through hub 5 (S8).

Meanwhile, after step S7A, in a case where the distribution request of the captured image or the captured video is not received from recorder 30 through network communicator 23 of monitoring camera CA1 (S6A, NO), the process of monitoring camera CA1 returns to step S1.

Figure 6:
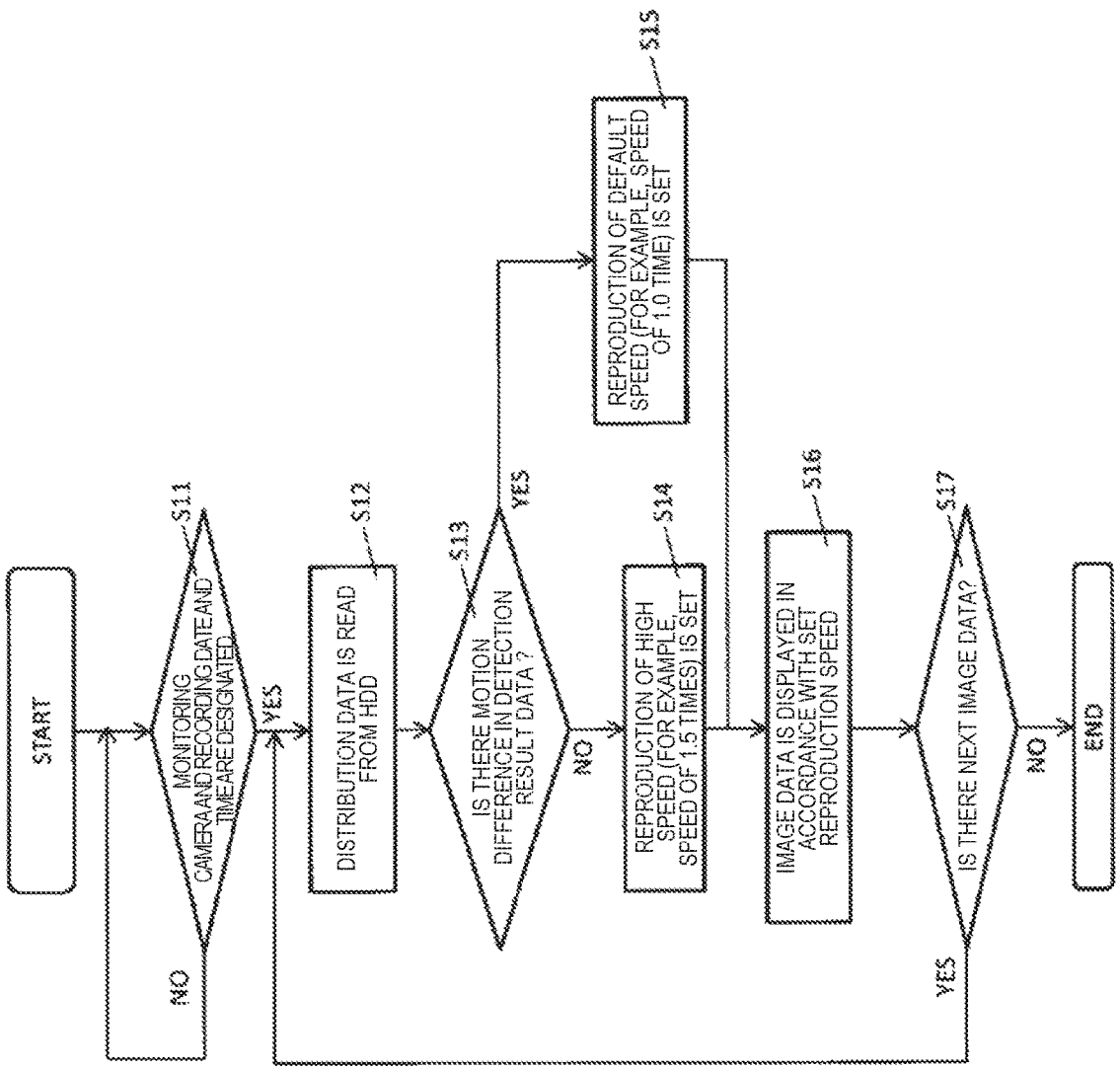
FIG. 6 is a flowchart for explaining an example of an operation procedure relating to setting of a reproduction speed when a captured video (for example, moving image file) is reproduced in the recorder of the embodiment in detail.

FIG. 6 is a flowchart for explaining an example of an operation procedure relating to setting of the reproduction speed in detail when the captured video (for example, moving image file) is reproduced in recorder 30 of the present embodiment. As a premise of the explanation of FIG. 6, the captured video (for example, moving image files) to be a target reproduced in recorder 30 has already been recorded on HDD 39.

In FIG. 6, by an input operation of the monitoring person using operator OP, since the captured video to be the target reproduced in recorder 30 is selected, when the identification information and the recording date and time information of the monitoring camera are designated (S11, Yes), controller 31 instructs generation of the obtainment request of various types of data corresponding to the identification information and the recording date and time information of the monitoring camera which are designated, to motion difference controller 41a and image data controller 41b. As long as the identification information and the recording date and time information of the monitoring camera are not designated by an input operation of the monitoring person (S11, NO), the process of recorder 30 does not proceed to step S12.

Motion difference controller 41a outputs the obtainment request of the detection result data of the motion difference corresponding to the data of the captured image or the captured video corresponding to the identification information and the recording date and time information of the monitoring camera to record device controller 37 according to the instruction from controller 31. Record device controller 37 reads the detection result data of the motion difference associated the identification information of the monitoring camera included in the obtainment request from HDD 39, and outputs the read result to motion difference controller 41a according to the obtainment request from motion difference controller 41a (S12). Motion difference controller 41a outputs the detection result data of the motion difference corresponding to the instruction from controller 31 to controller 31.

Image data controller 41b outputs the obtainment request of the data of the captured image or the captured video corresponding to the identification information and the recording date and time information of the monitoring camera, to record device controller 37 according to the instruction from controller 31. Record device controller 37 reads the data of the captured video associated the identification information of the monitoring camera included in the obtainment request from HDD 39, and outputs the read result to image data controller 41b according to the obtainment request from image data controller 41b (S12). Image data controller 41b outputs the data of the captured video corresponding to the instruction from controller 31 to controller 31.

Controller 31 determines the presence or absence of the motion difference in the detection result data of the motion difference for each frame image configuring the captured video (for example, moving image file) satisfying the identification information and the recording date and time information of the monitoring camera designated in step S11 (S13). For example, in a case where it is determined that there is information (for example, "1" or "Yes") indicating that there is a motion in one pixel among the entirety (entire area, for example, 320 pixels×480 pixels) of the frame images to be a target of the determination in the detection result data of the motion difference, controller 31 determines that there is a motion in the frame image. Similarly, for example, in a case where it is determined that there is information (for example, "0" or "None") indicating that there is no motion in one pixel among the entirety (entire area, for example, 320 pixels×480 pixels) of the frame images to be the target of the determination in the detection result data of the motion difference, controller 31 determines that there is no motion in the frame image.

In a case where it is determined that there is no motion in the frame image (S13, NO), controller 31 sets a speed (in other words, reproduction speed) at a time in which the frame image is switched and displayed from the frame image being currently displayed on monitor DP to a speed indicating a high reproduction speed (for example, 1.5 times high speed) (S14). Although the speed indicating high reproduction is exemplified as 1.5 times, the speed is not limited to 1.5 times. The speed may be, for example, 2.0 times, may be a speed within a range of 1.5 times to 2.0 times, or may be 2.0 times or more.

Meanwhile, in a case where it is determined that there is a motion in the frame image (S13, YES), controller 31 sets a speed (in other words, reproduction speed) at the time in which the frame image is switched and displayed from the frame image being currently displayed on monitor DP to a speed (for example, 1.0 time that is default speed) indicating normal reproduction (S15).

Controller 31 instructs monitor output unit 45 to switch and display the frame image on monitor DP according to the reproduction speed that is set in step S14 or step S15. Monitor output unit 45 switches and displays the frame image on monitor DP in accordance with the reproduction speed that is set in step S14 or step S15 according to the instruction from controller 31 (S16).

In a case where the frame image configuring the captured video (for example, moving image file) satisfying the identification information and the recording date and time information of the monitoring camera designated in step S11 still remains (that is, there is data of next frame image) (S17, YES), the process of recorder 30 returns to step S12. Meanwhile, in a case where there is no frame image configuring the captured video (for example, moving image file) satisfying the identification information and the recording date and time information of the monitoring camera designated in step S11 (S17, NO), the process of recorder 30 illustrated in FIG. 6 is terminated.

FIG. 7 is a schematic diagram illustrating an example of the relationship between the presence or absence of the motion difference and the reproduction speed.

In FIG. 7, in a section from time t1 to time t4, frame images FR1, FR2, FR3, and FR4 displayed on monitor DP by reproducing are displayed on monitor DP at reproduction speed A1 (A1: default value) by recorder 30 as a result of being determined that there is the motion difference. The reproduction speed corresponds to a display time on monitor DP until the currently displayed frame image is switched to the next frame image. For example, in FIG. 7, frame image FR1 is displayed on monitor DP in a section (t2-t1) from time t1 to time t2. In addition, frame image FR2 is displayed on monitor DP in a section (t3-t2) from time t2 to time t3. Similarly, in a case where it is determined that there is the same motion difference in frame images FR3 and FR4, these frame images FR3 and FR4 are also displayed on monitor DP at reproduction speed A1.

Meanwhile, in a section from time t4 to time t6, as a result of being determined that there is no motion difference in frame images FR5, FR6, FR7, FR8, FR9, FR10, and FR11 displayed on monitor DP by reproducing, frame images FR5, FR6, FR7, FR8, FR9, FR10, and FR11 are displayed on monitor DP at reproduction speed A2 (A2: default value satisfying A2>A1) by recorder 30. For example, in FIG. 7, frame image FR5 is displayed on monitor DP in a section (t5-t4) from time t4 to t5. Similarly, in a case where it is determined that there is the same motion difference in frame images FR6 to FR11, these frame images FR6 to FR11 are also displayed on monitor DP at reproduction speed A2.

In addition, also in a section after time t6, similar to a section between time t1 to time t4 as a result of being determined that there is the motion difference in frame images FR12 and FR13, frame images FR12 and FR13 are displayed on monitor DP at reproduction speed A1 (A1: default value) by recorder 30.

As described above, in the monitoring camera system 50 of the present embodiment, any monitoring camera connected to hub 5 captures an image of a predetermined area to be monitored in advance, detects the presence or absence of the motion in the captured image of the area, associates information relating to the motion with the captured video, and transmits the associated result to recorder 30. Recorder 30 records a result obtained by associating the captured video of the area captured by the monitoring camera with the identification information of the monitoring camera. Recorder 30 reproduces, on monitor DP, the captured video of an area recorded at the reproduction speed of the captured video (reproduction speed A2 illustrated in FIG. 7) in a section in which the motion is not detected, faster than the reproduction speed of the captured video (reproduction speed A1 illustrated in FIG. 7) in a section in which the motion is detected based on the information relating to the motion.

With this, in a case where a certain incident (for example, theft, injury, or the like) occurs at a store the monitoring camera system is installed, when the monitoring person checks a video of the monitoring camera at the time of occurrence of the incident, monitoring camera system 50 can shorten a content check time of the video. In addition, in monitoring camera system 50, when reproducing the video at the time of occurrence of the incident in recorder 30, since an operation such as a fast forward button and the like is not required by the monitoring person. Therefore, it is possible to improve the usability of the monitoring person when investigating the cause of the incident without performing a complicated operation by a video monitoring person.

In addition, recorder 30 performs reproduction at the reproduction speed of the captured video in a section in which the motion is detected as the reproduction speed of the default speed (for example, 1.0 time), and performs the reproduction at the reproduction speed of the captured video in a section in which the motion is not detected as the reproduction speed of 1.5 times the default speed. With this, since the monitoring person can shorten and simplify the content check time of the captured video in the section in which the motion is not detected, and the captured video to be checked in a section in which the motion was detected is reproduced at the default speed, it is possible to concentrate checking the content of the captured video.

Modification Example of Present Embodiment

In the above-described present embodiment, when determining the presence or absence of the motion difference with reference to the detection result data of the motion difference for each frame image, recorder 30 determines the reproduction speed according to the presence or absence of the motion difference in the entire (entire area) of the frame images based on one pixel or a predetermined number of pixels as a unit.

In the following modification example of the present embodiment (hereinafter, simply referred to as "modification example"), when the identification information and the recording date and time information of the monitoring camera are designated by, for example, the monitoring person, recorder 30 determines the reproduction speed according to the presence or absence of the motion difference in the entire of the frame images based on one pixel or a predetermined number of pixels as a unit in a target area designated by the monitoring person after recorder 30 starts reproduction of the corresponding captured video.

Figure 8B:
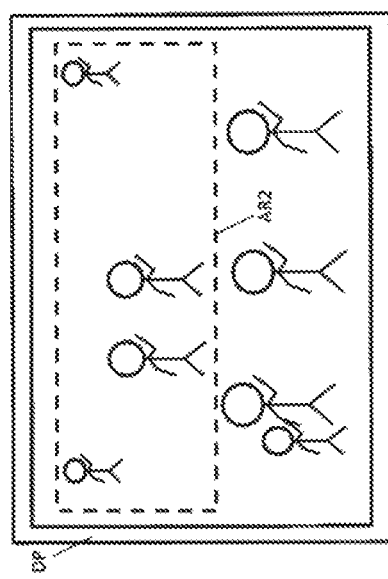
FIG. 8B is an explanatory diagram of a second example of the target frame of the monitoring person designated area which is a target for detecting the presence or absence of the motion in the captured video.
Figure 8C:
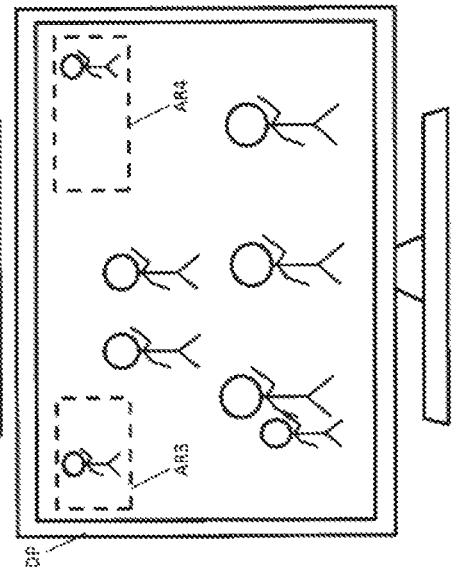
FIG. 8C is an explanatory diagram of a third example of the target frame of the monitoring person designated area which is a target for detecting the presence or absence of the motion in the captured video.
Figure 8A:
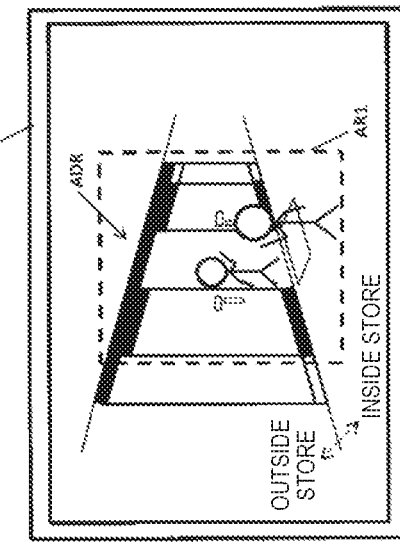
FIG. 8A is an explanatory diagram of a first example of a target frame of a monitoring person designated area which is a target for detecting the presence or absence of a motion in the captured video.

FIG. 8A is an explanatory diagram of a first example of target frame AR1 of a monitoring person designated area which is a target for detecting the presence or absence of the motion in the captured video. FIG. 8B is an explanatory diagram of a second example of target frame AR2 of the monitoring person designated area which is a target for detecting the presence or absence of the motion in the captured video. FIG. 8C is an explanatory diagram of a third example of target frames AR3 and AR4 of the monitoring person designated area which is a target for detecting the presence or absence of the motion in the captured video.

In FIG. 8A, for example, an example in which monitoring camera system 50 is installed in a store (for example, convenience store) and the captured image of the monitoring camera (for example, monitoring camera CA1) installed to be able to capture automatic door ADR at the entrance of the store is displayed on monitor DP is illustrated. For example, it is considered that there is a need to particularly monitor the vicinity of automatic door ADR in the vicinity of the center of a screen illustrated in FIG. 8A not the entire capturing range of monitoring camera CA1, by the security policy of the store. In order to satisfy such a need, when target frame AR1 is designated by the monitoring person, recorder 30 determines the presence or absence of the motion difference in target frame AR1 designated in the captured image, not the entire captured image. When it is determined that there is no motion difference, recorder 30 sets the reproduction speed of the frame image to 1.5 times the default speed. Meanwhile, when it is determined that there is the motion difference, recorder 30 sets the reproduction speed of the frame image to the default speed.

In FIG. 8B and FIG. 8C, examples in which monitoring camera system 50 is installed in, for example, a park rather than in the store and the captured image of the monitoring camera (for example, monitoring camera CA2) installed so as to be able to capture a certain point in the park is displayed on monitor DP are illustrated. For example, it is considered that there is a need to particularly monitor an area on the upper half of the screen illustrated in FIG. 8B or the vicinity of the upper left and upper right portions of the screen illustrated in FIG. 8C, not the entire capturing range of monitoring camera CA2. In order to satisfy such a need, when each of target frames AR2, AR3, and AR4 is designated by the monitoring person, recorder 30 determines the presence or absence of the motion difference in target frames AR2, AR3, and AR4 designated in the captured image, not the entire captured image. When it is determined that there is no motion difference, recorder 30 sets the reproduction speed of the frame image to 1.5 times the default speed. Meanwhile, when it is determined that there is the motion difference, recorder 30 sets the reproduction speed of the frame image to the default speed.

FIG. 9 is a flowchart for explaining an example of an operation procedure relating to setting of the reproduction speed of recorder 30 of a modification example of the present embodiment in detail. In the description of FIG. 9, the same step numbers are given to the same process as the process in FIG. 6, and the explanation will be simplified or omitted, and different contents will be described.

In FIG. 9, after step S12, controller 31 reproduces the data of the captured video obtained from image data controller 41b, outputs the reproduced data to monitor output unit 45, and displays the reproduced data on monitor DP (S21). With this, as illustrated in FIG. 8A to FIG. 8C, the captured video is displayed on monitor DP by a reproduction process of recorder 30. At a stage where the content of the captured video can be visually checked by the monitoring person as described above, the target frame in which the presence or absence of the motion difference is detected is designated on monitor DP by an operation (monitor person designating operation) of the monitoring person using operator OP (S22). Information indicating a position and a size of designated target frame (for example, target frames AR1, AR2, AR3, and AR4) is input to controller 31.

Controller 31 determines the presence or absence of the motion difference in the detection result data of the motion difference in the target frame designated in step S22 for each frame image configuring the captured video (for example, moving image file) satisfying the identification information and the recording date and time information of the monitoring camera designated in step S11 (S13A). Since the process after step S13A is the same as that in FIG. 6, detail description can be omitted.

As described above, in the present modification example, recorder 30 performs reproduction at the reproduction speed of the captured video (reproduction speed A2 illustrated in FIG. 7) in the section in which the motion is detected, faster than the reproduction speed of the captured video (reproduction speed A1 illustrated in FIG. 7) of the section in which the motion is not detected, based on the detection result data of the motion difference in the designated target frame, according to the designation of at least one target frame (for example, target frames AR1, AR2, AR3, and AR4) with respect to the captured video displayed on monitor DP. With this, since recorder 30 determines whether or not there is the motion difference in a range of the designated target frame by the monitoring person not the entirety of the frame images (entire area), it is possible to reduce a processing load at the time of determining the reproduction speed of the frame image, as compared to a case where the presence or absence of the motion difference is determined with respect to the entirety of the frame images (entire area).

In addition, in the present modification example, the position and size of the captured video of the monitoring target area displayed on monitor DP are changed by an operation (monitoring person designation operation) of the monitoring person using operator OP in the target frame (for example, target frames AR1, AR2, AR3, and AR4). With this, the monitoring person can arbitrarily select the position and size of interest places in terms of security such as crime prevention on the captured video displayed on monitor DP, and thereby improving the convenience of the monitoring person.

So far, while various embodiments have been described with reference to the drawings, it goes without saying that the present disclosure is not limited to such examples. Those skilled in the art will appreciate that various modifications or modifications can be conceived within the scope described in the claims, and it is obvious that they belong to the technical scope of the present disclosure as well.

The present disclosure is useful as the monitoring camera system and the reproduction method capable of shortening the content check time of the video desired to be checked by the monitoring person in a case of the occurrence of the incident, and improving the convenience of the monitoring person when investigating the cause of the incident without performing the complicated operation by the monitoring person.

What is claimed is:

1. A monitoring camera system comprising:
   at least one monitoring camera; and
   a recorder connected to the at least one monitoring camera, the recorder including a controller for controlling the operation of the recorder,
   the at least one monitoring camera is configured to capture a video of an area that includes one or more frame images of a monitoring target, detect a motion of an object on a frame-by-frame basis in the one or more frames of the captured video of the area, generate detection result data on a frame-by-frame basis based on the detected motion and even if no motion is detected and regardless of a determined difference in pixel values between frames, and transmits the detection result data for each frame to the recorder,
   the controller of the recorder associates the captured video of the area and the detection result data relating to the detected motion with identification information of the at least one monitoring camera, and records the detection result data, and
   the controller of recorder reproduces the captured video of the area, using the detection result data for each frame, on a monitor so that a reproduction speed of the captured video in a section in which motion is not detected is faster than a reproduction speed of the captured video in a section including the one or more frames in which motion is detected, the detected motion corresponding to designated target frames with respect to the captured video of the area displayed on the monitor.

2. The monitoring camera system of claim 1,
   wherein the target frame is a part of the area displayed on the monitor.

3. The monitoring camera system of claim 1,
wherein the controller of the recorder reproduces the captured video in the section in which the motion is detected at a default speed, and reproduces the captured video in the section in which the motion is not detected at the reproduction speed of 1.5 times the default speed.

4. The monitoring camera system of claim 1,
wherein in the target frame, a position and a size of the captured video of the area are changeable.

5. The monitoring camera system of claim 1,
wherein a position and a size of the target frame is designated by an user input when the captured video is displayed on the monitor.

6. The monitoring camera system of claim 2,
wherein a plurality of target frames are set with respect to the captured video of the area displayed on the monitor.

7. The monitoring camera system of claim 6,
wherein the controller of the recorder reproduces the captured video on the monitor in such a way that a reproduction is faster than a reproduction speed of the captured video in a section in which the motion is detected, based on the information relating to the motion corresponding to at least one of the target frames.

8. A reproduction method in a monitoring camera system including at least one monitoring camera and a recorder, the method comprising:

using the at least one monitoring camera, capturing a video of an area that includes a plurality of images of a monitoring target, detecting a motion of an object on a frame-by-frame basis in one or more frames of the captured video of the area, generating detection result data on a frame-by-frame basis based on the detected motion and even if no motion is detected and regardless of a determined difference in pixel values between frames, and transmitting the detection result data for each frame to the recorder, and using a controller of the recorder, associating the captured video of the area and the detection result data relating to the detected motion with identification information of the at least one monitoring camera, and recording the detection result data, wherein the controller of the recorder reproduces the captured video of the area, using the detection result data for each frame, on a monitor so that a reproduction speed of the captured video in a section in which motion is not detected is faster than a reproduction speed of the captured video in a section including the one or more frames in which the motion is detected, the detected motion corresponding to designated target frames with respect to the captured video of the area displayed on the monitor.

\* \* \* \* \*